INVENTOR.
GEORGE H. HEILMEIER
BY Edward J. Norton
Attorney

United States Patent Office 3,551,026
Patented Dec. 29, 1970

3,551,026
CONTROL OF OPTICAL PROPERTIES OF
MATERIALS WITH LIQUID CRYSTALS
George H. Heilmeier, Philadelphia, Pa., assignor to RCA
Corporation, a corporation of Delaware
Filed Apr. 26, 1965, Ser. No. 450,949
Int. Cl. G02f 1/26
U.S. Cl. 350—150
10 Claims

ABSTRACT OF THE DISCLOSURE

The optical characteristics of a mixture of a thermotropic nematic liquid crystal and another material are controlled by varying the molecular orientation of the nematic liquid crystal with a modulating signal. The other material can consist of either a pleochroic dye or particulate matter. Controlling the molecular orientation of the nematic liquid crystal enables control of the polarization of light passing through the mixture; while local variations in the absorption spectra of the dye can be obtained with the modulating signal. A display panel with a video modulating signal is provided.

---

This invention relates to liquid crystals and particularly to methods and apparatus for controlling the properties of materials mixed with liquid crystals.

Liquid crystals exhibit properties of liquids and properties of crystals. They are capable of flowing as liquids flow while exhibiting a molecular ordering which is more characteristic of crystals than of liquids. The characteristics of the molecular ordering differ among different liquid crystals. Three classes of liquid crystals, smectic, nematic and cholesteric are defined according to molecular ordering characteristics. The present invention is pimarily concerned with nematic liquid crystals. In nematic materials, regional molecular ordering characterized by parallel alignment of the molecules is observed. The orientation of the molecules of nematic liquid crystals, in addition to being ordered, can be controlled with external electric or magnetic fields. While this property of nematic liquid crystals has been known for some time, useful applications have been limited.

It is an object of the present invention to utilize the properties of nematic liquid crystals to control the properties of other materials mixed with the liquid crystals.

It is a further object of the present invention to utilize the properties of nematic liquid crystals to control the optical properties of a mixture of a nematic liquid crystal material and a second material.

A further object of the present invention is to control the color exhibited by a pleochroic dye in polarized light.

It is a further object of the present invention to control the color of dyes whose absorpion spectra are functions of the electric field in the vicinity of the molecules of the dye.

A further object of the present invention is to provide novel optical modulators.

A further object of the present invention is to provide novel display systems.

A further object of the present invention is to provide a technique for studying the absorption spectra of various dyes.

The above objects are accomplished according to the present invention by forming a mixture of a nematic liquid crystal "host" material with a second "guest" material. The molecular orientation of the nematic liquid crystal host is controlled by suitable means, for example through the application of an external electric or magnetic field. Molecular ordering of the host causes a corresponding ordering of the guest and thus the properties of the latter are subject to the control of the means controlling the nematic host ordering, e.g. an external field.

In one embodiment of the present invention the absorption spectrum of a guest pleochroic dye is controlled by mixing it with a nematic host. This effect provides the basis for optical modulators and optical display devices. It also enables a relatively simple study of pleochroic properties of dyes.

In a second embodiment of the present invention the absorption spectrum of a dye whose spectrum is a function of electric field in the vicinity of the dye molecules is controlled by mixing the dye with a nematic host. Modulators and display devices can be constructed according to this effect.

A more detailed description of the present invention will now be given with reference to the accompanying drawing in which.

Figure 1:
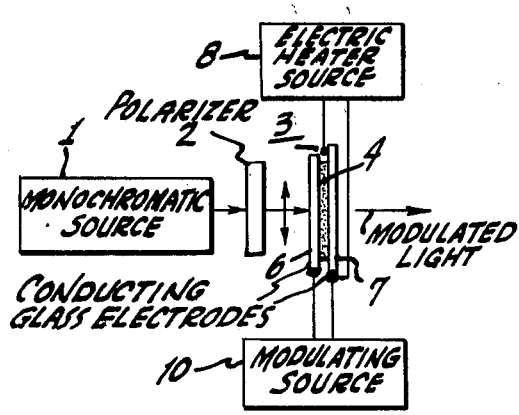
FIG. 1 is a block diagram of one embodiment of the present invention.

Before describing the embodiments of the invention shown in the drawing, a brief description of the effects used in the invention will be given.

While the structure of nematic liquid crystals has not been completely defined, the following description is presented for purposes of the present discussion. A nematic liquid crystal is a substance in which molecular ordering is observed over small regions of the nematic substance. The ordered regions are believed to be characterized by molecules arranged with their molecular axes parallel to each other and free to move in a direction parallel to their axes but restrained from relative motion in other directions. In the absence of any external controlling force, the ordered regions are essentially randomly orientated throughout the nematic substance.

Two examples of the nematic liquid crystals are p-n butoxy benzoic acid, which exhibits a nematic state between approximately 147 and 163 degrees centigrade, and butyl anysilidene amino cinnamate which exhibits the nematic state between approximately 90 to 110 degrees centigrade. Many other nematic substances are known, some of which are nematic at room temperature. A large number of other examples as well as a good description of liquid crystals generally may be found in either Gray, Molecular Structure and Properties of Liquid Crystals, Academic Press, London, 1962 or Brown et al., "The Mesomorphic State, Liquid Crystals," in vol. 57, No. 6, of Chemical Reviews, December 1957. Gray, on page 13, distinguishes thermotropic mesomorphism of nematic liquid crystals of the type described herein from lyotropic mesomorphism occurring in aqueous solutions of some compounds. The nematic materials disclosed herein are of the thermotropic type.

The orientation of the ordered regions in a nematic substance may be controlled with electric and magnetic fields. If a sufficiently strong electric field is applied across a nematic substance the ordered regions will arrange themselves such that the electric dipole moments of the molecules in each region are parallel to the applied electric field. In some nematic substances, the electric dipole moments of the molecules will be parallel to the molecular axes. In these materials an applied electric field will cause essentially all the molecules of the substance to align parallel to the applied field. Butyl anysilidene amino cinnamate is such a material. In other nematic substances, such as p-n butoxy benzoic acid, the electric dipole moments are perpendicular to the molecular axes. When one of the latter materials is placed in an electric field, the dipole moments will tend to align with the field, but the molecular axes throughout the material will not necessarily be parallel. In either case, a molecular ordering greater than the normal ordering of nematic substances may be obtained by applying electric or magnetic fields. The degree of ordering will depend upon the strength of the field applied.

I have discovered that by controlling the molecular orientation of a nematic "host" material with a suitable means, e.g. an electric or a magnetic field, properties of "guest" materials mixed with the nematic host may be controlled. When certain dyes for example are mixed with a nematic substance, their absorption spectra are influenced by the molecular ordering of the nematic substance and can be controlled. Moreover, small particles of a guest material tend to assume an ordered orientation similar to the nematic host. If flake-like particles of aluminum, for example, are mixed with a nematic host the long dimensions of the flake-like particles tend to align themselves parallel to the molecular axes of the molecules of the nematic substance. When an electric field is applied to the nematic host which includes a guest material the resulting orientation of the host molecules results in a corresponding ordering of the guest material. This effect enables a control of the optical properties of the guest material.

The absorption spectrum of a guest pleochroic dye mixed with a host nematic substance may be controlled with an applied field. The absorption spectrum of a pleochroic dye is a function of the direction of polarization, with respect to the molecular axes of the dye molecule, of the light incident upon it. Virtually all dyes exhibit pleochroicism to some extent. However, the degree of pleochroicism is greater in some dyes than in others. Dyes in which the pleochoic effect is pronounced are well known in the art. Two examples are methyl-red and indolphenol-blue. The color exhibited by a methyl-red guest mixed with a p-n butoxy benzoic acid host varies from orange to yellow depending upon the direction of polarization of the incident light with respect to the axes of the dye molecules. The color of indolphenol-blue in the same host varies between a very deep blue and a pale blue.

When a pleochroic dye is mixed with a nematic substance, the orientation of the dye molecules may be controlled by controlling the orientation of the nematic host molecules. Thus the color exhibited by the dye in plane polarized light may be controlled.

The absorption spectra of many materials are functions of the local electric field in the vicinity of the molecules of such materials. Therefore, if the local electric field in the viciity of the molecules is controlled the absorption spectrum may be controlled. I have found that a host nematic substance under the influence of an external electric or magnetic field may be used to control the local fields in the vicinity of guest molecules mixed with the nematic substance. When a material whose adsorption spectrum varies with local electric field is mixed with a nematic substance control of the orientation of the molecules of the host nematic substance results in a control in the electric field in the vicinity of the guest molecules and thus a control in the absorption spectrum of the material.

An example of a material whose absorption spectra varies with local molecular field is methyl-red. As noted above methyl-red exhibits pleochroicism to a significant degree. It can be shown however that the absorption spectrum of methyl-red also varies as a function of local molecular electric field.

Any of the above mentioned effects may be employed to intensity modulate a light beam. FIG. 1 shows a light modulator constructed according to the present invention and employing a pleochoic guest in a nematic host. A source 1 of monochromatic light, for example a laser, generates a light beam which is passed thorugh a polarizer 2. The light from the polarizer 2 passes through a modulator 3 which is constructed according to the present invention. The modulator 3 includes a mixture 4 of a nematic liquid crystal and a pleochroic dye supported between two transparent conducting electrodes 6 and 7. The mixture 4 may be a thin film held between the two electrodes 6 and 7 by surface tension. Alternatively a suitable enclosure may be used to contain the mixture 4. The thin film construction has the advantage that low control voltages may be used. The particular liquid crystal and dye combination will depend on the particular application and the frequency of the source 1.

The emission line of the monochromatic source 1 matches the absorption spectrum of the dye mixed with the nematic substance. A suitable dye for use with a given monochromatic source will have an absorption spectrum which, due to the pleochoic characteristic, is variable at the emission line of the monochromatic source. One suitable combination of source and dye is a neodymium laser generating a second harmonic at 5,300 A. (angstroms) and methyl-red with p-n butoxy benzoic acid in a concentration of about one tenth to one percent dye by weight. Since the absorption spectrum of methyl-red includes 5,300 A., and is variable at this wavelength due to the pleochroic effect it is a suitable dye for use with the second harmonic of a neodymium laser.

The preparation of the mixture 4 of nematic substance and pleochroic dye depends in part upon the type of nematic substance used. Where the molecular axes of the nematic substances are parallel to the dipole moments of the molecules, a condition exhibited by butyl anysilidene amino cinnamate for example, no special preparation is required and the mixture may merely be placed between the two electrodes 6 and 7. However, where the molecular axes of the nematic substance are perpendicular to the dipole moments as in p-n butoxy benzoic acid, then it is desirable to establish an initial orientation of the molecular axes by the following procedure.

One of the transparent electrodes, e.g. the electrode 6, is treated with an acid such as HCl to form a roughened surface which provides many points at which the liquid crystal molecules may attach themselves. The mixture of nematic substance and dye is then applied to the roughened glass surface in a manner such that a preferential direction of the molecules is obtained. This may be accomplished by wiping the electrode in one direction with a cotton swab soaked with the mixture of nematic material and dye. The second electrode 7 is then placed over the mixture deposited on the first electrode 6. This procedure establishes a preferential orientation of the molecules of the mixture. The molecular axes tend to align in a direction parallel to the direction of wiping. Further orientation of the molecules is established when the field is applied across the mixture from the modulating source 10 establishing an alignment of the dipole moments.

The electrodes 6 and 7 are of conventional construction, an example being tin oxide coated glass. One of the electrodes 7 serves as a heating element to maintain the temperature of the nematic substance at a proper value. Where the host is nematic at ambient temperatures, heating is not required. Where p-n butoxy benzoic acid is used as the nematic host the temperature is maintained between 147 and 163 degrees centigrade. Heating is accomplished by passing a current from the heating source 8 through the conductive coating on the electrode 7. A source of modulating signals 10 is connected to the conducting portions of the electrodes 6 and 7 to establish an electric modulating field across the mixture 4.

The light beam from the polarizer 2 which enters the modulator 3 is polarized in a direction parallel to the paper as indicated. When no field is applied across the mixture 4 its color in plane polarized white light may be described as orange. The orange color is due to the lack of ordering of dye molecules in the host. As a voltage is applied across the mixture 4, its color in white light polarized in a direction parallel to the molecular axes changes from orange to yellow as the electric field changes from zero volts to approximately $10^4$ volts per centimeter. The change is caused by the alignment of the dipole moments of the molecules parallel to the applied field. By varying the field applied across the mixture 4 with the source 10 the amount of ordering of the dye molecules is varied and therefore the amount of light absorbed by the material at any one frequency in the absorption band is varied. Since the source 1 is essentially monochromatic, the beam passing from the source 1 through the mixture 4 is intensity modulated by the modulating signals from the modulating source 10.

The p-n butoxy benzoic acid used in the above described embodiment is a nematic material whose optic axis aligns in a direction perpendicular to the applied electric field. Other nematic materials such as butyl anysilidene amino cinnamate align with their optic axes parallel to the applied electric field. Either type of nematic substance is suitable for use in the modulator shown in FIG. 1. It should also be noted that while methyl-red has been described in the above embodiment in general any pleochroic dye may be employed, due consideration being given to matching the dye with the source of monochromatic light and to possible chemical reactions between the dye and the liquid crystal itself. Furthermore, while the modulator of FIG. 1 has been described with respect to an electric control field a magnetic field may also be used.

Figure 2:
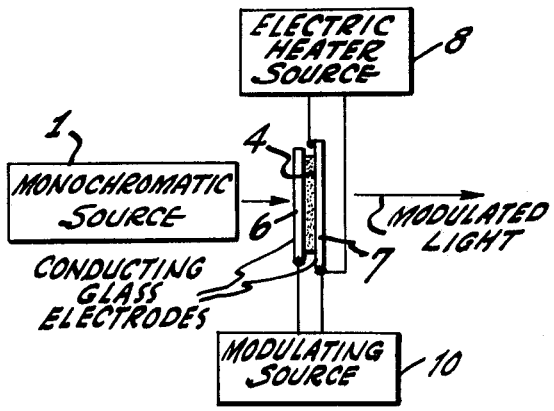
FIG. 2 is a block diagram of a second embodiment of the present invention.

FIG. 2 is a diagram of an intensity modulator where a dye whose absorption spectrum is a function of the electric field in the vicinity of the molecules of the dye is mixed with a nematic host. The construction of the modulator of FIG. 2 is similar to that of FIG. 1 except that no polarizer is required. The same reference numerals as used in FIG. 1 are used for corresponding elements in FIG. 2. As noted above, methyl-red exhibits an absorption spectrum which is a function of the electric field in the vicinity of the dye molecules and therefore methyl-red is a suitable dye for use in the modulator of FIG. 2. Other dyes which exhibit this effect may of course be used. The monochromatic source 1 may be the same as that used in the modulator of FIG. 1, i.e. a neodymium laser with a second harmonic output frequency at approximately 5,300 A. A suitable nematic host is p-n butoxy benzoic acid. The same concentration and temperature of the mixture 4 as used in the embodiment of FIG. 1 may be used here. Also, the same procedure for obtaining an initial ordering of molecules on one of the glass electrodes as described above may be used here.

As the electric field is applied from the source 10 across the mixture 4 the absorption spectrum of the mixture is changed. This may be explained by noting that with no field applied, the dipole moments of the nematic substance are not ordered. The electric fields in the vicinity of the dye molecules therefore are not ordered and in general the dye molecules experience different electric fields throughout the mixture. As the electric field is applied across the mixture 4 more ordering is achieved and the electric fields in the vicinity of the dye molecules become more ordered. The absorption spectrum of the mixture with ordered electric fields is different than the absorption spectrum with randow electric fields. Since the absorption spectrum of the mixture 4 varies with the applied field, the intensity of the light beam passing through the modulator is a function of the electric field applied across the mixture 4. As signals are applied from the modulating source 10 across the mixture 4 the output beam of the modulator is intensity modulated in accordance with the signals supplied.

A modulator employing particles dispersed in a nematic substance may be constructed along the same lines as the modulator of FIG. 2. For example the mixture 4 in FIG. 2 may comprise flake-like particles of aluminum mixed with p-n butoxy benzoic acid in a mixture of about ten percent particles by volume. Where particles are dispersed in the nematic host the source 1 need not be monochromatic but rather any source of light may be used. As an electric field is applied across the mixture of particles and nematic substance the amount of light transmitted through the mixture will depend upon the orientation of the particles in the mixture. Maximum transmission will be obtained when the flake-like particles align with their long dimensions in a plane parallel to the direction of the light beam. This will occur when a field gradient of approximately $10^4$ volts per centimeter is applied across the mixture. When no field gradient appears in the mixture the flake-like particles will assume a more or less random distribution due to the random distribution of the ordered regions of the nematic host material. The light beam passing through the modulator is therefore intensity modulated by the modulating signals from the modulating source 10 applied across the mixture. Reflective particles dispersed in a nematic material may also form the basis for a reflective modulator. Instead of causing the light beam which is to be modulated to pass through the mixture, it may be reflected from the mixture.

Figure 3:
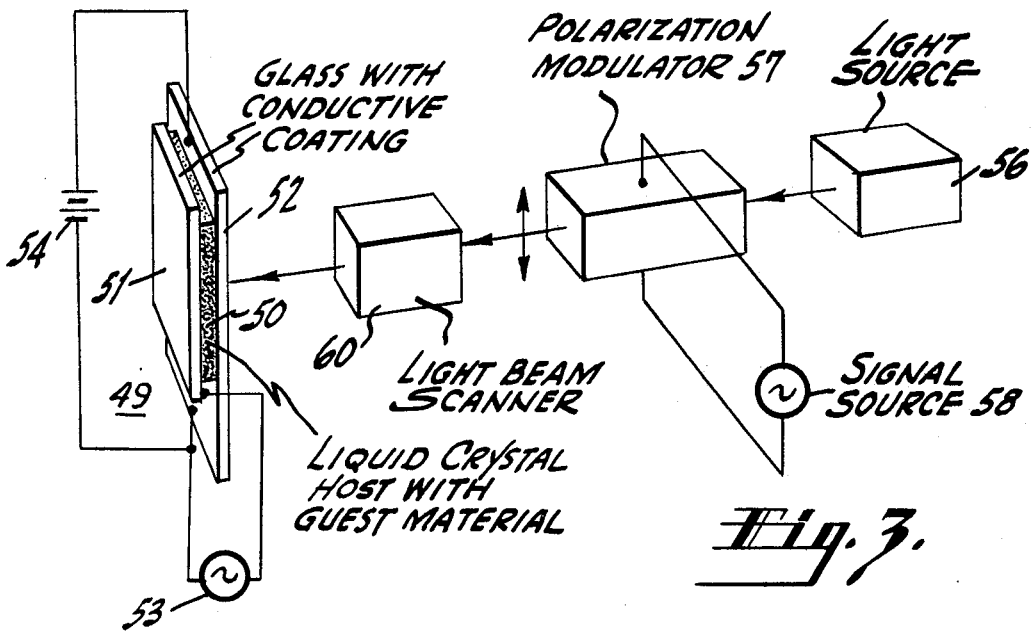
FIG. 3 is a block diagram of a third embodiment of the present invention.

FIG. 3 shows a third embodiment of the present invention. In FIG. 3 a mixture of a nematic host and a suitable pleochoric guest dye is employed as a display device. A mixture 50 of nematic host and guest material is supported between two conducting transparent electrodes 51 and 52 by surface tension to form a display panel 49. The molecular axes of the molecules of the mixture 50 are essentially parallel to each other and to the electrodes 51 and 52. The process for obtaining this orientation is the same as that described with reference to the modulator of FIG. 1. The same mixture as used in the modulator of FIG. 1, i.e. methyl-red mixed in p-n butoxy benzoic acid, is suitable here. The transparent electrodes 51 and 52 may be tin oxide coated glass. A source of voltage 53 is applied across the two transparent conducting electrodes 51 and 52. The source 53 may be either A.C. or D.C. but the former is preferred because it tends to eliminate electrochemical decomposition of the dye. The maximum field gradient established by the source 53 is approximately $10^4$ volts per centimeter. Since the mixture 4 is very thin, the maximum value of the voltage generated by the source 53 may be less than 100 volts. The electrode 51 is used as a heater to maintain the nematic substance at its proper value, i.e. between approximately 147 and 163 degrees centigrade where p-n butoxy benzoic acid is employed. A source 54 of electric energy is applied across the two ends of the electrode 51 to provide a resistive heating effect by passing a current through the resistive coating on the electrode 51. A light source 56 generates a light beam which enters a polarization modulator 57 across which is established a video signal which will determine the intensity of the image established on the display 49. The source 56 generates light whose emission spectrum includes the absorption spectrum of the pleochroic dye of the mixture 50. For example, the source 56 may generate white light. The polarization modulator 57 may be of the conventional electro-optic type, for example, a KDP crystal. The polarization of the light beam from the polarization modulator 57 depends upon the value of the video signal applied across the modulator 57 from the suorce 58. The beam from the output of the polarization modulator 57 is supplied to a scanning device 60 which causes the beam of light to scan electrode 52. The scanning device 60 may take any suitable form, for example, a rotating mirror scanner.

In the operation of the display device of FIG. 3 the electric field produced by the source 53 across the mixture 50 causes an ordering of the dye molecules mixed with the nematic liquid crystal in addition to the ordering established when the mixture was wiped onto one electrode. The electric field provided by the source 53 aligns the molecular dipole moments of the nematic host. This alignment causes a corresponding alignment of the dye molecules. The color exhibited by the panel 49 in plane polarized white light will therefore depend upon the direction of polarization of the light passing through the mixture 50 due to the pleochroicism of the dye molecules.

The scanning device 60 causes a light beam to scan the transparent electrode 52 and thus pass through the mixture 50. The polarization of the light beam scanning the electrode 52 is controlled by the polarization modulator 57 in accordance with the video signal applied to the modulator from the source 58. Thus, as the signal applied to the polarization modulator 57 varies, the color of the beam passing through the mixture 50 will vary. Where a mixture of methyl-red and p-n butoxy benzoic acid is employed as the mixture 50, the color may be controlled from orange when the incident light beam is polarized in a direction parallel to the molecular axes of the dye molecules to yellow for a polarization at right angles to this direction. Synchronization between the video signal applied to the polarization modulator 57 and the scanning of the light beam across the electrode 52 may be accomplished by conventional television techniques.

Where a larger color variation than is obtainable by using one dye alone is desired, a plurality of display panels, each with a different dye mixed with the nematic substance, may be employed. The panels are stacked so that the light beam passes through each plate. A suitable choice of dyes will result in the desired range of color variation.

While one particular embodiment of a display system has been described many other arrangements are possible. For example instead of varying the polarization of the light beam which scans the display device the polarization may be fixed at a constant value and the field across the mixture of the dye and nematic substance may be varied. Furthermore, an electron beam may be employed to scan the mixture of nematic liquid crystal and dye rather than the light beam scanning the liquid crystal. The intensity of the electron beam would then be controlled to produce local variations in absorption spectrum across the display area in accordance with a video signal.

Furthermore, instead of employing a pleochroic dye mixed with a nematic substance a dye whose absorption spectrum is a function of local molecular field may be mixed with a suitable nematic substance. In this case the light beam used to scan the display area need not be polarized. The electric field across the mixture would be controlled to produce the desired color variation.

Particles of a reflective material, for example aluminum, may be mixed with a nematic substance to form a display device. A display device employing such a mixture may be operated with a scanning electron beam the intensity of which is controlled by a video signal. The amount of light reflected from the display panel would then be a function of the intensity of the electron beam impinging upon the mixture of particles and nematic substance.

What is claimed is:
1. An optical modulator comprising
 (a) a mixture of a first material and a thermotropic nematic liquid crystal,
 (b) means for causing a beam of light to be incident upon said mixture, and
 (c) means for varying the molecular orientation of said nematic liquid crystal in response to a modulating signal, said modulating signal affecting the transmission of said light past said first material.

2. The optical modulator as recited in claim 1 wherein said first material is a dye.

3. In combination:
 (a) a mixture of pleochroic dye with a thermotropic nematic liquid crystal,
 (b) means for varying the molecular orientation of said mixture in response to a modulating signal, and
 (c) means for causing a beam of polarized light to be incident upon said mixture whereby the light transmitted through said mixture is dependent upon said signal.

4. In combination:
 (a) a mixture of a pleochroic dye and a thermotropic nematic liquid crystal positioned between two transparent parallel electrodes,
 (b) means for applying a modulating voltage across said electrodes to cause molecular orientation of said mixture, and
 (c) means for causing a beam of polarized light to pass through said electrodes and said mixture whereby the light transmitted through said mixture is dependent upon said voltage.

5. An optical modulator comprising:
 (a) a mixture of a pleochroic dye and a thermotropic nematic liquid crystal positioned between two transparent parallel electrodes,
 (b) means for establishing a modulating electric signal between said transparent electrodes, said signal controlling the molecular orientation of said mixture,
 (c) a source of polarized light having an emission frequency included in the absorption spectrum of said dye, and
 (d) means for causing a beam of light from said source to be incident upon said mixture whereby the light transmitted through said mixture is dependent upon said modulating signal.

6. In combination:
 (a) a panel including a mixture of pleochroic dye and a thermotropic nematic liquid crystal,
 (b) means for causing polarized light to be incident upon said panel, and
 (c) means for locally varying the absorption spectrum of said dye with respect to said light incident upon said panel in response to a modulating signal.

7. In combination:
 (a) a panel composed of a mixture of a thermotropic material and a second material,
 (b) means for causing light to be incident upon said panel, and
 (c) means for locally varying the relative orientation of the molecules of said nematic material with respect to the polarization of said incident light in response to a modulating signal, said modulating signal affecting the transmission of said light past said second material.

8. A display device comprising:
 (a) a panel including a mixture of a pleochroic dye and a thermotropic nematic liquid crystal said mixture being spaced between two parallel transparent electrodes,
 (b) means for establishing a preferential orientation of the molecules of said mixture,
 (c) means for causing a beam of polarized light to scan said panel, and
 (d) means for varying the polarization of said beam of light in response to a modulating video signal.

9. A display device comprising:
 (a) a panel including a first transparent glass electrode,
 (b) a mixture of pleochroic dye and thermotropic nematic liquid crystal adjacent said transparent electrode where the molecules of said nematic mixture have a preferential orientation and a second transparent electrode parallel to the first transparent electrode and adjacent said mixture,
 (c) means for establishing a modulating electric field between said transparent electrodes,
 (d) means for causing a beam of polarized light to scan said panel, and
 (e) means for varying the polarization of said beam of light scanning said panel.

10. A display device comprising:
 (a) a panel including a first transparent glass electrode,
 (b) a mixture of pleochroic dye and thermotropic nematic liquid crystal adjacent said transparent electrode where the molecules of said mixture have a preferential orientation and a second transparent electrode parallel to the first transparent electrode and adjacent said mixture,
(c) means for establishing an electric field between said transparent electrodes,
(d) means for establishing an electric current through the conductive portion of one of said electrodes to heat said liquid crystal,
(e) means for causing a beam of polarized light to scan said panel, and
(f) means for varying the polarization of said beam of light scanning said panel.

References Cited

UNITED STATES PATENTS

| | | | |
|---|---|---|---|
| 2,335,659 | 11/1943 | Fraenckel et al. | 350—160(P) |
| 2,400,877 | 5/1946 | Dreyer | 350—155 |
| 2,544,659 | 3/1951 | Dreyer | 350—154X |
| 3,114,836 | 12/1963 | Fergason et al. | 350—160(P) |
| 3,257,903 | 6/1966 | Marks | 350—150UX |

FOREIGN PATENTS

| | | | |
|---|---|---|---|
| 441,274 | 1/1936 | Great Britain | 350—150 |

OTHER REFERENCES

Foex: "Magnetic Properties of Mesomorphic Substances, Analogies With Ferromagnetics," Trans. of the Faraday Society, vol. 29, No. 9, pp. 958–967, September 1933.

Quarterly Report of the University of Cincinnati to U.S. Air Force under Contract No. AF 33(616)33 (June 1, 1954).

DAVID SCHONBERG, Primary Examiner

P. R. MILLER, Assistant Examiner

U.S. Cl. X.R.

350—154, 157, 160